(No Model.)
J. W. McALPIN.
TRANSPLANTING POT.
No. 451,064. Patented Apr. 28, 1891.
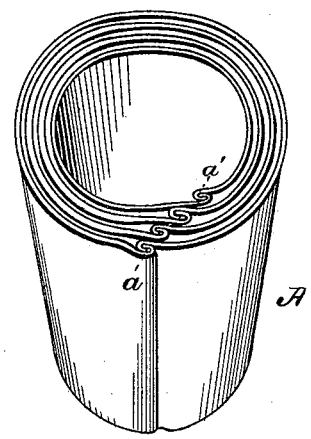
Fig. 1.
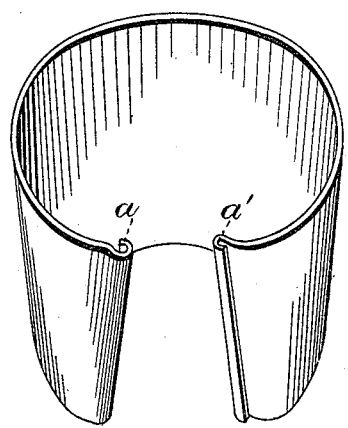
Fig. 2.
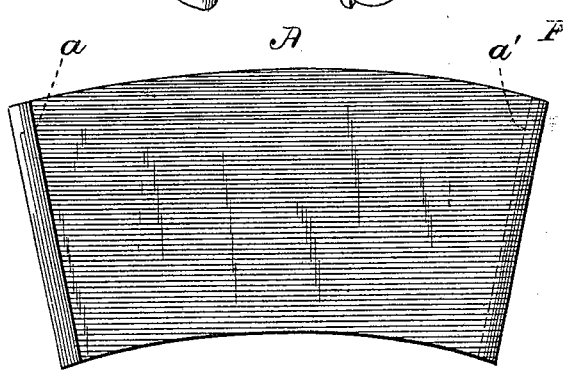
Fig. 3.
Fig. 4.
Witnesses
M. B. Harris
J. C. Wilson
Inventor
James W. McAlpin
by
Whitman & Wilkinson
Attorneys

UNITED STATES PATENT OFFICE.

JAMES WALLACE McALPIN, OF SAVANNAH, GEORGIA.

TRANSPLANTING-POT.

SPECIFICATION forming part of Letters Patent No. 451,064, dated April 28, 1891.

Application filed January 7, 1891. Serial No. 376,997. (No model.)

*To all whom it may concern:*

Be it known that I, JAMES WALLACE MC-ALPIN, a citizen of the United States, residing at Savannah, in the county of Chatham and State of Georgia, have invented certain new and useful Improvements in Transplanting-Pots; and I do hereby declare the following to be a full, clear, and exact description of the invention, such as will enable others skilled in the art to which it appertains to make and use the same.

My invention relates to transplanting-pots such as are used by gardeners and nurserymen in transplanting flowers, seedlings, shrubs, &c., and its object is to provide a cheap and convenient striking and transplanting-pot.

Reference is had to the accompanying drawings, wherein the same parts are indicated by the same letters.

Figure 1 is a perspective view of a "nest" of my improved transplanting-pots. Fig. 2 is a perspective view of one of my transplanting-pots, showing my method of clasping the same. Fig. 3 is a plan view of one of my blanks. Fig. 4 represents a cross-section of the same.

A represents the blank, made, preferably, of tin or thin galvanized sheet-iron or other resilient metal. The blank is turned over at the ends, forming the clasps $a$ and $a'$, adapted to engage each other, as shown.

The seed is sown or plants pricked in the earth previously placed in the clasped pot. I then either set the pot in the ground or place it on suitable boards or other supports. Frequently I use a board as a bottom for one or more pots in setting them in the earth. When the plant is ready for transplanting, the boards are taken up or a trowel is run under the pot, which is then lifted, placed on a suitable tray, and carried to the spot where it is to be set out. Here a hole of suitable size is prepared or a furrow run to receive the plant. The pot is placed over the hole or distance selected in the furrow and by a moderate pressure on the sides is unclasped. The earth in the pot, previously moistened so as not to cling to the sides, is allowed to slip out as a solid mass into the hole, where new soil is packed around the pot-earth and the plant is in no way injured by the change.

The pots, it will be noted, are bottomless, and to prevent the earth from dropping out in handling they should be made tapering enough to act as an inclosing wedge on the earth, pressing its particles together should the inclosed mass slip down any, thus preventing any material crumbling or falling out of the particles of earth and so exposing to injury the roots of the plant.

It will be obvious that my bottomless pots may be made in many varying sizes; but it will be necessary to have the larger pots not only deeper, but more tapering to obtain the utmost freedom from injury to the plant in transplanting.

My pots are not fragile like the earthenware and metallic pots now most commonly in use, and being of thin cheap metal are light, cheap, and durable. It will be seen that they may be used over and over again. Moreover, being thin and generally similar in shape, they may be readily packed in nests, taking up but little space in transporting and storing.

I am aware that metallic pots made of blanks of tin or other metal have been patented; but the fastening devices upon these are either more complex, more inconvenient, or more expensive than that described in my invention.

I am also aware that similar joints are used in stove-pipes; but my flower-pot is of peculiar shape and does away with the necessity for a bottom for the same, and it is also superior as to simplicity and cheapness over any hitherto patented.

I claim and desire to secure by Letters Patent of the United States—

A bottomless transplanting-pot in the form of a frustum of a cone, made of a blank A, with straight edges $a$ and $a'$ turned over obversely and adapted to engage each other, as and for the purposes described.

In testimony whereof I affix my signature in presence of two witnesses.

JAMES WALLACE McALPIN.

Witnesses:
SIDNEY L. KRAUSS,
HENRY McALPIN.